US007175779B1

(12) United States Patent
Kricheldorf et al.

(10) Patent No.: US 7,175,779 B1
(45) Date of Patent: Feb. 13, 2007

(54) THERMOTROPIC MAIN-CHAIN LIQUID CRYSTALLINE POLYMERS AND METHOD OF INCREASING THE MELT PROCESSIBILITY OF POLYESTER-BASED LIQUID CRYSTALLINE POLYMERS

(75) Inventors: Hans Kricheldorf, Hamburg (DE); Andreas Gerken, Hannover (DE)

(73) Assignee: Optatech Corporation, Espoo (FI)

( * ) Notice: Subject to any disclaimer, the term of this patent is extended or adjusted under 35 U.S.C. 154(b) by 0 days.

(21) Appl. No.: 09/979,673

(22) PCT Filed: May 3, 2000

(86) PCT No.: PCT/FI00/00389

§ 371 (c)(1),
(2), (4) Date: Feb. 7, 2002

(87) PCT Pub. No.: WO00/66647

PCT Pub. Date: Nov. 9, 2000

(30) Foreign Application Priority Data

May 3, 1999 (FI) ...................................... 991006

(51) Int. Cl.
*C09K 19/38* (2006.01)
*C09K 19/52* (2006.01)
*C08G 63/02* (2006.01)

(52) U.S. Cl. ........................... 252/299.01; 252/299.67; 528/190; 528/193; 528/194

(58) Field of Classification Search ............ 252/299.01, 252/299.67, 299.6, 299.61, 299.62, 299.63, 252/299.64, 299.65, 299.66, 299.68; 523/190, 523/193, 194
See application file for complete search history.

(56) References Cited

U.S. PATENT DOCUMENTS

| 4,438,236 | A | * | 3/1984 | Cogswell et al. | ............ 525/165 |
| 4,918,154 | A | * | 4/1990 | Hayashi et al. | ............. 528/190 |
| 4,999,416 | A | * | 3/1991 | Kaminade et al. | .......... 528/190 |
| 5,097,001 | A | * | 3/1992 | Layton et al. | ............... 528/193 |
| 5,124,477 | A | * | 6/1992 | Suzuki et al. | ................ 562/424 |

(Continued)

FOREIGN PATENT DOCUMENTS

EP     0 008 855    *   3/1980

(Continued)

OTHER PUBLICATIONS

STN International, File Caplus, accession No. 1996:67534 CAPLUS (Sumitomo Chemical Co.), "Liquid crystalline Polyester Compositions", JP 07292362 A 2 19951107.

(Continued)

*Primary Examiner*—Shean C. Wu
(74) *Attorney, Agent, or Firm*—Cohen Pontani Lieberman & Pavane LLP

(57) ABSTRACT

A thermotropic main-chain liquid crystalline homo- or copolymer forming a liquid crystalline phase and containing an aromatic monomer with functional groups in ortho- or meta-position. The polymer exhibits both isotropic and anisotropic properties. The present invention also provides a method for the preparation of the present polymers as well as a method of increasing the melt-processibility of polyester-based liquid crystalline polymers comprising the step of incorporating into the polymers 1 to 30 mol-% of, e.g., a ortho-substituted monomer with hydroxyl and/or carboxylic groups.

20 Claims, 3 Drawing Sheets

U.S. PATENT DOCUMENTS

| | | | | |
|---|---|---|---|---|
| 5,529,716 | A | * | 6/1996 | Nomura et al. ........ 252/299.01 |
| 5,578,243 | A | * | 11/1996 | Mazaki et al. ......... 252/299.01 |
| 5,599,478 | A | * | 2/1997 | Matumoto et al. ..... 252/299.01 |
| 5,891,532 | A | * | 4/1999 | Furuta et al. .................. 428/1 |
| 5,928,586 | A | * | 7/1999 | Nomura et al. ............. 264/102 |

FOREIGN PATENT DOCUMENTS

| | | | |
|---|---|---|---|
| EP | 0 265 240 | | 4/1988 |
| EP | 0 380 286 | | 8/1990 |
| EP | 0 964 014 | * | 6/1999 |
| EP | 0 964 014 | | 12/1999 |
| WO | WO 97/34964 | | 9/1997 |

OTHER PUBLICATIONS

STN International, File Caplus, accession No. 1996:604467, Document No. 125:: 276756 (Orifici Andrea F. et al), "Preparation and Characterization of Thermotropic Liquid Crystal Copolyesters Containing M-Hydroxybenzoic Acid Units", Polymer, vol. 37, No. 19 (1996).

* cited by examiner

THERMOTROPIC MAIN-CHAIN LIQUID CRYSTALLINE POLYMERS AND METHOD OF INCREASING THE MELT PROCESSIBILITY OF POLYESTER-BASED LIQUID CRYSTALLINE POLYMERS

This is a U.S. national stage of application No. PCT/FI00/00389, filed on May 3, 2000. Priority is claimed on that application and on the following application(s): Country: Finland, Application No.: 99,1006, Filed: May 3, 1999.

BACKGROUND OF THE INVENTION

1. Field of the Invention

The present invention concerns liquid crystalline polymers and processes for the production thereof. The present invention also relates to blends of liquid crystalline polymers and thermoplastics.

2. Description of Related Art

All liquid crystalline (LC) polymer phases have in common that chain segments or mesogens adopt a more or less parallel alignment. LC main chain polymers primarily consist of para-substituted aromatic building blocks which favour linear conformations in combinations with suitable links such as ester, amide, azo or ethylene groups. Therefore, all known thermotropic main-chain LCP's comprise straight and stiff chains with only small structural deviations from "rigid rods" obtained by kinks, bends, etc. which are necessary for the melt processing.

The straight segments of the LC polymers, also called the "mesogens", easily find each other and form the "mesophase" which is characteristic for all LCP:s. In a mesophase, the mesogens are oriented in the same direction which is the direction of the melt flow. The chains are therefore placed in parallel alignment beside each other and with essentially no inter-mingling or formation of entanglements. This means that the properties in flow direction and transverse direction, respectively, are very different. The phenomenon is called "anisotropy" and it constitutes one of the greatest disadvantages of LCP's and LCP-blends. Thus, for example, the tensile strength of an LCP is very good in the flow direction but extremely bad in the transverse direction. Due to the lack of entanglements the melt elasticity and the melt strength are also almost non-existent. As a result, an extended melt does not snap back into its original shape. This very detrimental effect on the melt flow also makes it almost impossible to obtain even thickness profiles in films, and in blown-film extrusion the bubble is very unstable. The problem with uneven thickness profiles becomes even worse when LCP's are coextruded with normal isotropic polymers. Further, it is almost impossible to apply many other melt processing techniques like blow-moulding, thermoforming etc. to LCP's and LCP-blends due to the lack of the necessary melt-strength.

It is known in the art that the degree of anisotropy can be slightly decreased by adding fillers and/or isotropic polymers (LCP-blends), but the results obtained are not satisfactory. Technical solutions for making isotropic LCP-products include the use of a rotating die, a cone-extruder and various other mechanical means which create different orientations of the LCP-chains at different depths in the product. In this way isotropic solid state properties can be obtained but still no melt elasticity and melt strength.

In liquid crystalline polymers, monomers having both functional groups in ortho- or meta-position are considered to be interrupting units which severely destabilize the LC phase. It is known in the art that oligomers can be built up from catechols and a dicarboxylic acid [Kricheldorf, H. R. et al. Macromolecules 26 (1993) 5161–5168]. The molecular weights of these known oligo(ester imide)s were low (DP<2000 Da) for unknown reasons. Based on the results obtained for liquid crystalline oligomers no distinct conclusions can be drawn for polymers of technically interesting molecular weights.

Technical polymers containing ortho- or meta-substituted compounds are also known in the art.

Thus, EP 0 380 286 (Nippon Oil) discloses the use of divalent aromatic ortho-compounds (meta compounds as references) in wholly aromatic polyester type LCP:s in order to lower the melting point without impairing the mechanical properties. Here these ortho-compounds (catechol, ortho-phthalic acid, salicylic acid etc.) distort the linearity of the LCP-chains so that the melting points are reduced to below their degradation temperature making them melt processable. However, in EP 0 380 286 the effect of the ortho-compounds on the melting point is rather small. The lowest melting point obtained (Example 2) was as high as 341° C. which makes these LCP:s totally unsuitable for any extrusion application.

EP 0 265 240 (Polyplastics) suggests using two or more naphthalene based monomers in order to improve the mechanical properties of LCP:s. By doing so it is especially the flexural strength and the coefficient of linear expansion which become more balanced in the machine direction and the transverse direction in injection moulding. WO 97/34964 (Hoechst Celanese) teaches the use of isophthalic acid in order to facilitate polycondenzation of polyesteramide type LCP:s containing hydroquinone as monomer. U.S. Pat. No. 5,454,910 (Korea Institute of Science and Technology) discloses a method for manufacturing LCP-fibres with certain characteristics. Here metahydroxybenzoic acid has been used.

JP 07292362 (Sumitomo Chemical) comprises blends of LCP and syndiotactic polystyrene.

JP 07233249 (Nippon Oil) comprises LCP:s for optical devices with controlled birefringence.

In summary, none of the above mentioned publications teaches or suggests a technical solution for providing (improved) melt strength in LCP's which would allow for extrusion of the polymers. The property of melt strength is crucial in all extrusion processes, but in particular in coextrusion and alloying with isotropic polymers.

SUMMARY OF THE INVENTION

It is an object of the invention to provide novel modified liquid crystalline polymers having a sufficient molecular weight and length between chain ends for technical purposes and exhibiting improved processability, in particular for processing by extrusion.

It is also an object to provide modified liquid crystalline polymers having a novel combination of improved properties in respect of melt elasticity, melt strength and isotropic properties to allow for coextrusion and blending with other polymers, in particular thermoplastics.

It is a further object to provide a novel process for producing these liquid crystalline polymers, in particular to provide a method of modifying polyester-based liquid crystalline polymers in order to increase the melt-processibility thereof.

It is still a further object to provide blends of liquid crystalline polymers and thermoplastic polymers.

These and other objects, together with the advantages thereof over the known liquid crystalline polymers and polymer blends and manufacturing processes thereof, which shall become apparent from specification which follows, are accomplished by the invention as hereinafter described and claimed.

The present invention is based on the surprising finding that ortho-substituted monomers, in particular ortho-substituted hydroxy acid monomers, can be incorporated into liquid crystalline polymers in amounts of up to 30 mol-% to provide thermotropic liquid crystalline polymers exhibiting a unique mix of both isotropic and anisotropic properties. The new polymers are thermotropic mainchain liquid crystalline homo- or copolymers which form a liquid crystalline phase (a meso-phase). However, at the same time, the polymers of the present invention comprising monomers connected to neighboring monomers in the main chain via functional groups in ortho-position exhibit isotropic properties manifested in the form of increased melt strength and melt elasticity.

The incorporation of an aromatic monomer with the functional groups in ortho-position in an amount of 1 to 30 mol-% into the mainchain of the polymer, represents a highly versatile tool of modifying the melt-processability of any polyester-based liquid crystalline polymer.

In addition to ortho-substituted monomers, it is possible to use meta-substituted monomers and, generally, any monomers having the reactive terminal groups which react with the corresponding groups of the adjacent monomers forming part of the mainchain of the LCP in a position different from the para-position so as to provide sharp bends and possibly hair-pin conformations. With ortho-substitution, the required amount of monomers for achieving such structure is smaller than for monomers with another substitution.

As discussed above, in the art ortho-compounds have been used instead of meta-compounds to improve some mechanical properties of LCP's. However, the prior art is silent about using ortho- (or meta-) compounds in LCP's for producing entanglements which improve melt strength. Entanglements are, in particular, obtained when the ortho-compounds are introduced into LCP's exhibiting irregularities in the chemical structure. Such irregularities may comprise meta- (or ortho-) compounds, kinks, bulky side-groups and/or aliphatic segments.

More specifically, the liquid crystalline polymers according to the present invention are main-chain liquid crystalline homo- or copolymers which form a liquid crystalline phase and contain an aromatic monomer with functional groups in the ortho- or meta-position. The liquid crystalline polymers according to the invention have entanglements, increased melt strength and exhibit simultaneously isotropic and anisotropic properties.

The polymer blend according to the invention contain as a blending component an LCP as described above wherein the LCP is compatible with the other thermoplastic blending components.

In another aspect, the invention pertains to polymer products which comprise an LCP as described above and a polymer blend as described above.

The method of increasing the melt-processibility of polyester-based liquid crystalline polymers is characterized by the step of incorporating into the polymers an aromatic monomer with the functional groups in ortho- or meta-position in an amount of 0.1 to 30 mol %.

The present invention provides considerable advantages.

The present invention provides a solution to overcome two of LCP:s most negative properties when used in extrusion, viz. 1. the anisotropy and 2. the opaqueness; and the method can be applied to any thermotropic main-chain LCP not only the fully aromatic polyester type LCP:s.

Thus, the LCP's of the present invention comprise chains which in addition to straight chain portions also contain very sharp bends, hair pin conformations and possibly cyclic polyesters due to the ortho-substituted monomers the polymer chains of the present LCP's. Surprisingly, in the present modified LCP's the mesogens of different chains and possibly also mesogens of the same chain appear to be able to find each other and to form meso-phases which provides for LCP-properties. Due to the sharp bends of the polymer chain the polymers contain entanglements, similar to those in flexible isotropic polymers, which provide properties of melt elasticity, melt strength and isotropic properties which can be achieved without fillers and without blending the LC polymers with other polymers or without employing special processing techniques.

By using the LCP:s of the present invention or blends thereof with other polymers, it is possible to produce, for instance, coextruded blown-films with an even thickness profile of the LCP-layer. Biaxially the mechanical properties of the present modified LCP's are much more balanced than those of conventional LCP's (as known in the art the mechanical properties are not equal even in blown-films made of LDPE) and these properties can be further improved by increasing the blow-up ratio. Also assymmetrical coextruded structures can be made easily due to the improved melt flow properties. The present invention also facilitates production of blow-moulded, thermoformed and foamed products as well as blends with other isotropical polymers. Product properties are improved.

Due to the non-linear conformation of the LCP-chains, extension of the solid products is easier than with conventional LCP's. This is necessary in processes related to solid state deformation like stretch blow-moulding and solid state thermoforming. Improved elongation of the final product is also very important in most applications for LCP and LCP-blends. This prevents cracking of the LCP or LCP-blend when the product is bent (lay flat tube of a blown-film, bending of a pipe or cable in installation etc.).

Finally, and importantly, when the amount of ortho- and/or meta-substituted monomers is such that the bending radius of mesogens is smaller than the wave length of visible light, the LCP materials become translucent or even transparent. This is a surprising feature, because generally perfectly transparent copolyesters have not exhibited liquid crystalline properties.

The terms and expressions which have been employed are used as terms of description and not of limitation, and there is no intention in the use of such terms and expressions of excluding any equivalents of the features shown and described or portions thereof, it being recognized that various modifications are possible within the scope of the invention

Description of Preferred Embodiment

Definitions

Figure 1:
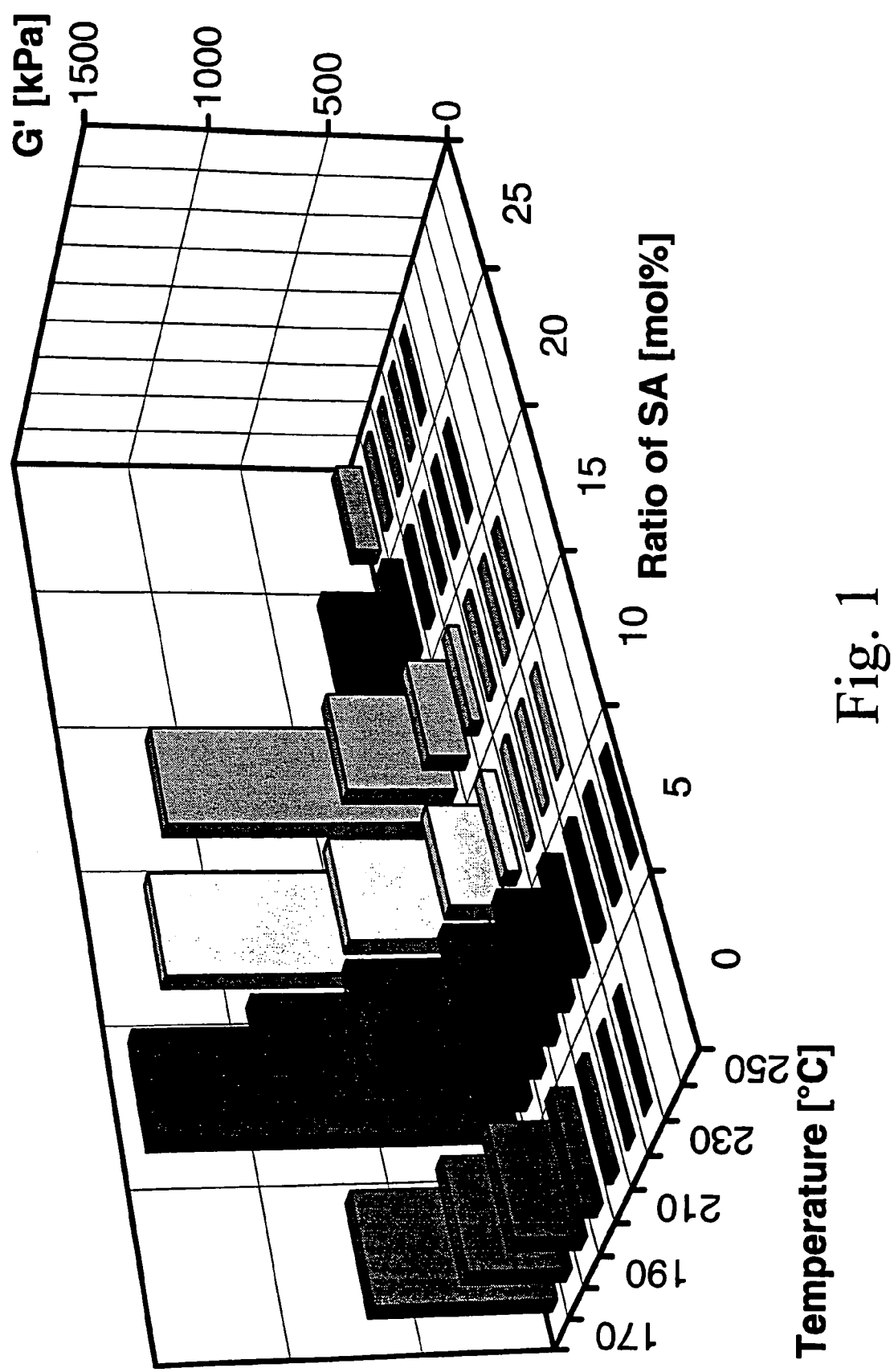
FIG. 1 shows the storage modulus G' of a 40:60 copolyester (Table 1) measured with variation of temperature.

Within the scope of the present invention, the term "aromatic ortho- or meta-substituted monomer" denotes any aromatic structure with 1 to 3 aromatic rings which comprise two functional groups which are positioned in such a way that sharp bends in the LCP-chains can be obtained. Preferably the functional groups are in ortho-position, i.e. coupled to adjacent ring atoms of the structure, but they may also be positioned in the aromatic structure in another way which will provide the sharp bends. A multiring structure of the present aromatic monomer may comprise fused aromatic rings (e.g. a naphthalene or anthracene structure) or aromatic rings bonded together with a single or double bond (e.g. a biphenyl structure).

In a phenyl structure, the functional groups are typically present in 1,2-position or possibly in meta-position. In a naphthalene structure, the functional groups are present in positions 1,2; 1,3; 2,3; 2,7; or 2,8. In a biphenyl structure, the functional groups can be present in positions 2,3 (or 2',3'); 2',3 (or 2,3'); 3,3'; 3',4 (or 3,4'); 2,5' (or 2',5); 3,5 (or 3',5'); or 3,4 (or 3',4').

Typically the functional groups are selected from groups which are capable of reacting with hydroxy, carboxylic, amino or imino groups or derivatives thereof (e.g. acyl groups, anhydrides and acid halides) in order to form a chemical bond, in particular an ester, amide, imide, ether or carbonate bond.

The aromatic ring may contain other substituents in addition to the above-mentioned functional groups in ortho-position.

In the present context, the properties of a polymer are considered to be "isotropic" if they are similar in machine direction and in transverse direction thereto. For example, the magnitude of the mechanical strength properties of isotropic polymers is usually the same, for example the tensile strength in transverse direction is at least 20% of the corresponding strength in machine direction and vice versa. By contrast, the properties of conventional liquid crystalline polymers are rather different.

The terms "anisotropic polymer" or "liquid crystalline polymers (LCP's)" are inter-changeably used for polymers which exhibit a mesophase in which the mesogens are oriented in the direction of the melt flow. In liquid state, in particular as a melt (=thermotropic LCP's), the polymer properties lie between the boundaries of solid crystals and isotropic liquids.

For the purpose of the present invention, the term "compatibilizer" means a substance which promotes the compatibility of the isotropic and anisotropic components of the compounds.

The present invention concerns both modified liquid crystalline polymers and blends of the novel modified liquid crystalline polymers and isotropic polymers.

The Novel Modified Liquid Crystalline Polymers

The present invention comprises any kind of thermotropic main-chain LCP containing small amounts of aromatic monomers with the functional groups on ortho- or meta-position providing hair-pin conformation and hence entanglements and melt strength. When using ortho-functionalized monomers very low concentrations like 5% acetylsalicylic acid is enough to obtain hair-pin conformation whereas for meta-functionalized monomers somewhat higher concentrations are needed because of the bigger angle between the functional groups. Melt strength (combination of melt viscosity and melt elasticity) is a rheological property which can be very accurately characterized with many methods but dynamic rheometry providing G', G" and * is one of the best defined methods. Increasing G', G" and * (despite decreasing molecular weight measured with solution viscometry) for increasing amounts of acetylsalicylic acid indicate the appearance of entanglements due to hair-pin conformation. The melt strength of standard LCP:s is almost non-existent (anisotropic) and any kind of melt extension in connection with extrusion (film, extrusion coating, blow moulding, etc.) but especially coextrusion is therefore extremely difficult. By introducing entanglements (more isotropic), however, these difficulties in extrusion can be overcome, and the present polymers are well suited to processing by extrusion, including film extrusion, extrusion coating and blow moulding.

By "improved" melt strength it is herewith meant that the melt strength of the present modified LCP's is at least 5%, preferably at least 10%, and in particular at least 15%, greater than that of the corresponding unmodified LCP.

The present liquid crystalline polymer comprises an aromatic main chain anisotropic polymer, preferably an anisotropic polyester, poly(ester amide), poly(ester ether), poly(ester carbonate) or poly(ester imide), which is modified as will be explained in more detail below, with 0.1 to about 30 mol % of a monomer having at least two functional groups selected from hydroxy and carboxy groups in ortho or meta position.

The liquid crystalline polymer contains "irregularities" in the chemical structure. By irregularities are meant any chemical structures in the main chain or any side chain which influence and change the chemical character of the liquid crystalline polymer compared to that of a rigid rod or stiff mainchain LCP. In particular the irregularities reduce or modify the anisotropic character of the LCP. The "irregularities" preferably comprise at least one of the following structures: meta- (or ortho) compounds, kinks and aliphatic segments in the main chain and bulky side-groups. Together with the ortho- (or meta-) substituted monomers, these irregularities will give rise to entanglements of the LCP-chains and hence to improved melt strength.

In the following description, whenever reference is made to the addition of the present monomers, the molar concentration thereof is indicated for the feed. That is, the monomer concentration has been calculated from the total amount of reactants fed into polymerization. It has turned out that the actual amount of monomer in the polymer will be somewhat lower; typically an amount of 5 mol % ASA or a similar ortho- or meta-substituted monomer in the feed will yield a polymer containing about 4 mol % residues derived from that monomer. Similarly a 10% molar feed will give about 8 mol % residues, 20 mol % in the feed will yield about 12 to 14 mol % and 25 mol % in the feed will give 14 to 17 mol % in the polymer.

In contrast to the oligomers described in Macromolecules 26 (1993) 5161–5168, the present modified LCP's are true engineering plastics which can be melt-processed by extrusion, injection moulding etc. to provide polymer product having sufficient mechanical properties for practical applications as, e.g., films, pipes, containers, and various moulded parts.

Using ortho-compounds in addition to meta-compounds, kinks, bulky side-groups and/or aliphatic segments it is possible to provide entanglements of the LCP-chains and hence melt strength which is crucial in all extrusion processes but especially in coextrusion and alloying with isotropic polymers. The use of ortho-compounds to provide melt strength is not limited to wholly aromatic polyester type LCP's. Melt elasticity can also be obtained by adding small amounts of ortho-compounds (acetyl salicylic acid etc.) to polyesterimide type amorphous LCP's (Optatech's OPTIMIDE) and not fully aromatic polyester type LCP's (Unitika's RODRUN) as well as fully aromatic polyester or polyesteramide type LCP's with kinks (Ticona's VECTRA).

The LCP can also comprise a copolymer of a polyester, such as a copolymer of poly(ethylene terephthalate) and hydroxy benzoic acid or a copolymer of hydroxy-naphthoic acid and hydroxybenzoic acid. These copolymers contain similar amounts of the modifying component.

Generally, the liquid crystalline polymer, which is used in the present invention, can be defined as a polymer which is formed when the components of the following general formulas (or at least two of them) are reacted with each other: a dicarboxylic acid of formula I

$$HOOC-R_1-COOH \quad (I)$$

a diol of formula II

$$HO-R_2-OH \quad (II)$$

a hydroxycarboxylic acid of formula III

$$HO-R_3-COOH \quad (III)$$

wherein $R_1$, $R_2$, and $R_3$ each independently represents a bivalent aromatic or aliphatic hydrocarbon group, a group of formula $R_4-X-R_5$, wherein $R_4$ and $R_5$ represent a bivalent aromatic hydrocarbon group and X is an oxygen or a sulphur atom, a sulphonyl, carbonyl, alkylene, or ester group or X is a single bond, a xylylene group or a bivalent aliphatic hydrocarbon group.

The liquid crystalline polymer can also comprise a homopolymer and copolymer of a hydroxycarboxylic acids of formula III.

In addition to monomers I to III, the present modified liquid crystalline polymers comprise an ortho-substituted aromatic compound of formula IV

$$o-X^1-Ar-X^2 \quad (IV)$$

wherein

Ar stands for an aromatic ring structure $X^1$ and $X^2$ represent independently functional groups capable of reacting with hydroxy, carboxy, amino, imino or anhydride groups to form ester, amide, imide, ether or carbonate bonds Typically, the aromatic dicarboxylic acids of formula I are selected from the group comprising terephthalic acid, 4,4'diphenyl-dicarboxylic acid, diphenyl ether-4,4'-dicarboxylic acid, diphenylethane-4,4'-dicarboxylic acid, 4,4'-triphenyl-dicarboxylic acid, 2,6-naphthalenedicarboxylic acid, diphenoxyethane-4,4'-dicarboxylic acid, diphenoxybutane-4,4'-dicarboxylic acid, naphthalene-1,5-dicarboxylic acid, and N-(4-carboxyphenyl)-trimellitic acid imide.

Said aromatic dicarboxylic acids may be alkyl-, alkoxy-, or halogen-substituted. The substituted derivatives can be selected from the group comprising chloroterephthalic acid, dichloroterephthalic acid, bromoterephthalic acid, methylterephthalic acid, dimethylterephthalic acid, ethylterephthalic acid, methoxyterephthalic acid, and ethoxyterephthalic acid The alicyclic dicarboxylic acids of formula I can be selected from the group comprising trans-1,4-cyclohexanedicarboxylic acid, cis-1,4-cyclo-hexanedicarboxylic acid, and trans-1,3-cyclobutane dicarboxylic acid.

The alicyclic dicarboxylic acids may also be substituted by one or more alkyl-, alkoxy-, or halogen-substituent(s). The substituted dicarboxylic acid derivatives can be selected from the group comprising trans-1,4-(1-methyl)-cyclohexane-dicarboxylic acid and trans-1,4-(1-chloro)cyclohexane-dicarboxylic acid.

The aromatic and aliphatic diols of formula II can be selected from the group comprising hydroquinone, 4,4'-dihydroxydiphenyl, 4-4'-dihydroxytriphenyl, 2,7-naphthalenediol, 2,6-naphalene-diol, 4,4'-dihydroxydiphenyl ether, 3,3'-dihydroxydiphenyl, 1,1-bis(4-hydroxyphenyl)-methane, bis(4-hydroxyphenoxy)-ethane, 2,2-bis(4-hydroxyphenyl)propane, and 4,4'-dihydroxy-benzophenone. These diols may be substituted by one or more alkyl-, alkoxy-, or halogen substituent(s), which derivatives are exemplified by the following list: chlorohydroquinone, methylhydroquinone, 1-butylhydroquinone, phenylhydroquinone, methoxyhydroquinone, phenoxy-hydroquinone, 4-chlororesorcinol, t-butyl hydroquinone, and 4'-methylresorcinol.

Typical examples of alicyclic diols of formula II include trans- and cis-1,4-cyclohexane-diols, trans-1,4-cyclohexane-dimethanol, cis-1,2-cyclohexane-diol, and trans-1,3-cyclo-butane diol. Instead of these compounds the corresponding alkyl-, alkoxy-, or halogen-substituted derivatives can be used, as well.

The aliphatic diols of formula II can be straight-chained or branched and selected from the group comprising ethylene glycol, 1,3-propanediol, 1,4-butanediol, and neopentyl glycol.

The aromatic hydroxycarboxylic acids of formula III are selected from the group comprising 4-hydroxybenzoic acid, 6-hydroxy-2-naphthoic acid, and 5-hydroxy-1--naphthoic acid. These compounds can be alkyl-, alkoxy-, or halogen-substituted. The substituted aromatic hydroxycarboxylic acid derivatives are preferably selected from the group comprising 3-methyl-4-hydroxybenzoic acid, 3,5-dimethyl-4--hydroxybenzoic acid, 2,6-dimethyl-4-hydroxybenzoic acid, 3-methoxy-4-hydroxybenzoic acid, 3,5-dimethoxy--4-hydroxybenzoic acid, 6-hydroxy-5-methyl-2-naphthoic acid, 6-hydroxy-5-methoxy--2-naphthoic acid, 3-chloro-4-hydroxybenzoic acid, 2,3-dichloro-4-hydroxybenzoic acid, 3,5-dichloro-hydroxybenzoic acid, 2,5-dichloro-4-hydroxybenzoic acid, 3-bromo--4-hydroxybenzoic acid, 6-hydroxy-5-chloro-2-naphthoic acid, 6-hydroxy-7-chloro--2-naphthoic acid, and 6-hydroxy-5,7-dichloro-2-naphthoic acid.

In the ortho-substituted aromatic compounds of formula IV the two functional groups are independently selected from hydroxy, carboxy and amino groups and reactive derivatives thereof, such as acyl and acid chloride groups. The aromatic ring comprises 5 to 7 ring atoms, at least one of which can be comprised of a heteroatom selected from the O, N and S. Usually, the aromatic ring is a phenylene ring containing identical or different substitutents in positions 1 and 2, such 1,2-dihydroxybenzene (catechol), 1,2-benzene-dicarboxylic acid (o-phthalic acid) and 2-hydroxybenzoic acid (salicylic acid) and derivatives thereof. Diacetylated catechol can be mentioned as an example of a catechol derivative. Salicylic acid and its derivatives are particularly preferred because it can be used as a hydroxy acid for modifying existing LCP compositions without having to change the amount of the other components. The preferred derivatives of salicylic acid include methylsalicylate, isoamyl salicylate, benzyl salicylate and acylated derivatives, such as 2-acetoxybenzoic acid (acetylsalicylic acid) and higher o-acyl salicylic acids.

In addition to the above mentioned polyesters, the LCP's used in the present invention can comprise the corresponding polyester amides. It is also possible to use polymers having a main chain containing conjugated double bonds, the monomer units of said main chain being linked to side chains which, together with the main chain render the polymer liquid-crystal properties. Examples of such polymers are polytiophene, polyaniline, poly-acetylene, polypyrrole and polyparaphenylene substituted with alkyl chains containing at least 8 carbon atoms.

The polyester-LCP's can be produced by polyesterification or transesterification as known in the art. Poly(ester imide) can be produced by polycondensing an aromatic polyester, such as poly(ethylene terephthalate), poly(ethylene naphthalate), poly(butylene terephthalate), poly(trimethylene terephthalate), poly(trimethylene naphthalate), poly(butylene naphthalate), or poly(cyclohexanol terephthalate) with a trimellitic acid imide or with derivatives thereof.

The following list exemplifies some preferred embodiments of the liquid crystalline polymers:

copolyesters of N-(4-carboxyphenyl) trimellit imide, terephthalic acid, hydroquinone, alkylhydroquinone, p-hydroxybenzoic acid and poly(alkylene terephthalate), the alkylene substituent preferably comprising ethylene, propylene or butylene and the alkyl substituent of the hydroquinone preferably comprising a lower alkyl group such as methyl, ethyl, propyl or (tertiary) butyl; (an LPC of the above kind is delivered by Optatech Corp. under the name OPTIMIDE);

copolyesters of p-hydroxybenzoic acid and poly(alkylene terephthalate), the alkylene group preferably being ethylene, propylene or butylene (LCP's known as Kuhfuss-polymers, such as a product marketed under the trade name Rodrun by Unitika, Japan);

copolyesters of terephthalic acid, alkylhydroquinone, p-hydroxybenzoic acid and hydroxyphenyl-alkanoic acids, the alkyl-substituent of the hydroquinone preferably comprising a lower alkyl group such as methyl, ethyl, propyl or (tertiary) butyl, the alkanoic acid preferably containing 3 to 8 carbon atoms, propanoic acid being particularly preferred (reference is made to, e.g., the LCP's of JP Patent No. 2 755 822, Optatech Corp.);

blockcopolyesters of trimellitic imide-terminated poly (THF) or polysiloxane, containing the imide group in para- or meta-position i.e. N-(4-carboxy-phenyl)-trimellit imide or N-(3'-acetoxy-phenyl)-trimellit imide, with acetoxybenzoic acid and at least one repeating unit selected from the group comprising diacetoxy diphenyl, hydroquinone diacetate, terephthalic acid, a trimer designated HBA-HQ-HBA (the synthesis of which is described in Europ. Polym. J. 20, 3, 225–235 (1984), and poly(ethylene terephthalate) (PET), for example LCP's of the kind described in EP Patent 0 660 854, Optatech Corp.; and para-aminophenol; hydroxy benzoic acid and hydroxy naphthoic acid, e.g. the LCP's marketed under the tradename Vectra by Ticona.

All the above mentioned polymers further contain an ortho-substituted aromatic compound of formula IV, in particular salicylic acid or acetylsalicylic acid in an amount of 0.1 to 30 mol %, preferably 1 to 10 mol %, in order to enhance its isotropic properties. The amount of the modifying component is sufficient to lower the processing temperature of the LCP to close to about 200° C. or even below.

The molecular weight of the liquid crystal polymer used in the present invention depends on the character of the repeating units of the LCP. Usually, the molecular weight is in the range of about 1,000 to 300,000. If fully aromatic polyesters are used as LCP's, their molecular weight is typically in the range of about 2,000 to 200,000, preferably about 10,000 to 50,000.

More general details on liquid crystalline polymers and their properties and applications are given in an article titled "Liquid Crystal Polymers and Their Applications" by Chung et al. in Handbook of Polymer Science and Technology, Vol. 2 (1989) 625–675.

Isotropic Polymer Component of Polymer Blends

The isotropic polymers used in polymer blends comprising the present modified LCP's can be any isotropic polymers, thermoplastics as well as thermosets.

Preferably thermoplastic polymers are employed. The isotropic polymers can be selected from the group comprising polyolefins and their copolymers, e.g. with vinyl acetate, butyl acrylate, methyl acrylate and ethyl acrylate; polyesters; polyamides; polyethers; polystyrene; polyvinylchloride; polyacrylics; e.g. poly-R-acrylate or poly-R-methacrylate, wherein R is methyl, ethyl, butyl or a similar substituent, polycarbonates, polyketones (e.g. polyetheretherketone), poly (ether imide)s and polyimides.

As specific examples of the isotropic polymers, the following may be mentioned: polyolefins such as polyethylene, polypropylene, polybutylene, polyisobutylene, poly(4-methyl-1-pentene), including copolymers of ethylene and propylene (EPM, EPDM) and chlorinated and chlorosulphonated polyethylenes. The isotropic polymer may also be comprised of polystyrene, PVC, fluoroethylene copolymers, poly(methyl(meth)acrylate) and other homo- and copolymers containing styrene, vinyl, acrylate and fluoroethylene groups, and different polyesters, such as poly(ethylene terephthalate), poly(butylene terephthalate) and polycarbonate, polyamides and polyethers (e.g. poly(phenylene ether). Particularly preferred polymers are the polyolefins, polyesters and poly(phenylene ether).

The molecular weights of the preferred isotropic thermoplastic polymers should be high enough to provide sufficient mechanical properties but low enough to make it possible to process the polymers in melt. The isotropic polymer should have a viscosity as close to the LCP as possible to allow for blending with the LCP.

Polymer Blends

The present blends comprise as a blendning component an LCP according to the present invention. In blends of LCP's and polyolefins according to the present invention, the LCP component is present in an amount of 1 to 99 parts by weight, the polyolefin (or other isotropic polymer component) likewise in an amount of 99 to 1 parts by weight. It is possible to use blends of the modified LCP's and isotropic polymers as barrier polymers having the LCP as the continuous phase, but it is equally possible to manufacture formed articles having the LCP component as the dispersed phase (reinforcement) of the blends. The present LCP's are compatible with the other thermoplastic blending components. If necessary, the compatibility of the LCP and the other thermoplastic blending components can, however, be improved by compatibilization. Thus, the present blends can also contain compatibilizers and plasticizers which facilitate the blending of LCP and polyolefin. A compatibilizer is added in amounts of 0.1–20% by weight calculated from the weight of the other components of the composition. The conventional function of the compatiblizers is to improve the mixing of the components and the impact properties of the polymer blend. Said compatibilizers and plasticizers are preferably functional polymers, such as maleic anhydride or glycidyl functionalized polyolefins and styrenic elastomers, alone or in combination.

Influence of Ortho-Substituted Compounds on the Properties of an LCP

In the following the influence of the ortho-substituted monomers on the properties of LCP's will be examined in more detail using acetylsalicylic acid (ASA) as an example.

The antimesogenic effect of ASA is surprisingly rather weak, as shown in the examples. A decrease of the crystallinity was also detectable in the examples, and the crystallinity faded away above 10 mol % (calculated from the feed) of acetylsalicylic acid. However, the influence of ASA on the glass-transition temperature proved to be rather complex.

As seen from the storage modulus, it is preferred to incorporate about 1 to 10 mol % (calculated from the feed) of ASA, in particular about 5 mol-% ASA. It appears that the incorporated ASA forms hair-pin conformation favoring entanglements. The competition between shorter molecules and increasing concentration of hair-pin conformation results in a maximum of the mechanical properties at 5 (feed) mol % of ASA. The measurements performed with a frequency sweep at 200° C. underline the afore discussed trends and their interpretation. The dynamic viscosity of the 5 (feed) mol % sample is higher than that of the 0% sample over the whole range of the applied frequencies.

The incorporation of ASA has a pronounced decreasing influence on the crystallinity of the copolyesters, but the influence on the stability of the nematic phase is much weaker than expected. Even with a 25 mol % content (calculated from the feed) of ASA the copolyesters possess a broad LC phase. Since the nematic order is based on a certain parallelization of chain segments, it must be assumed that the ASA units predominantly form hair-pin conformations which do not hinder a parallelization of chain segments. The existence of hair-pin conformations may favour the formation of large macrocycles, and the increasing tendency of cyclisation at higher ASA percentages may be responsible for the decreasing length of the molecules. The existence of hair-pin conformations favoring the formation of entanglements is also supported by rheological measurements. In all four series of LC copolyesters studied in this work the storage modulus, the loss modulus and the dynamic viscosity show a maximum around 5 mol % (calculated from the feed) of SA despite decreasing chain lengths. In a qualitative sense these maxima do not depend on the frequence of the measurements.

By choosing LCP-recipes with comonomers providing sharp bends it is possible to obtain very small mesophase domains. The mesogens of neighbouring molecules have to be parallel to form such domains but the sharper the bends the smaller the areas composed of parallel mesogens. When the sizes of the mesophases are smaller than the wavelength of light the LCP is transparent. As discussed in more detail in Example 4 below, the present invention provides completely novel LCP films exhibiting a unique combination of liquid crystallinity, transparency and elasticity at temperatures below 200° C.

ASA can be used as a monomer in any thermotropic main-chain LCP, made by polycondensation or transesterification. The most positive effects are the increasing melt strength and shear sensitivity obtained from molecular entanglement. ASA-modified LCP, therefore, has melt-flow properties which are closer to isotropic polymers. This facilitates melt-compounding and coextrusion with other isotropic polymers.

When adding small amounts of ASA also $T_g$ increases which can be useful for amorphous LCP:s (higher heat distortion temperature) like OPTATECH's poly(ester imide) LCP or crystalline LCP's with low melting points (higher heat distortion temperatures) like Unitikas Rodrun polyester-LCP. ASA can also be added to decrease the melting point of crystalline LCP's with high melting points so that they can be processed at lower temperatures. This is important when blending or coextruding with polymers like PE, PP and their copolymers which do not stand very high processing temperatures. LCP's with decreased melting points and their blends can then be processed with methods requiring lower temperatures like blown-film extrusion, extrusion blow-moulding, pipe extrusion, cable extrusion etc. as well as with post processing methods like monoaxial and biaxial stretching of films, strech-blow-moulding, fibre stretching, thermoforming etc. Examples of such crystalline LCP's with high melting points are Vectra and Xydar containing biphenol.

All these commercial LCP's can be modified with ASA so that they can be used for new applications and market segments.

Acetylsalicylic acid ASA is an inexpensive bulk chemical which is available from many sources. Therefore, cheaper LCP's can be made providing new, unexpected and advantageous property combinations like: simultaneously lower $T_m$ and higher $T_g$ providing a better combination of processing temperature and use temperature. The addition of ASA and the similar monomers will broaden the liquid crystalline range of the polymers by lowering the melting temperature without simultaneously significantly lowering the isotropization temperature nor the $T_g$.

Next the invention will be more closely examined with the aid of a number of working examples. The properties of the present modified liquid crystalline polymers are compared to conventional polyester-based LCP's prepared by polycondensation or transesterification.

Materials:

Poly(ethylene terephthalate), PET, provided by DSM (Gelen, the Netherlands).

N-(4-carboxyphenyl)-trimellitimide was prepared by reacting trimellitic acid with parabenzoic acid.

4-hydroxybenzoic acid, 4-aminobenzoic acid and trimellitic anhydride were provided by Bayer AG (Leverkusen, Germany).

For Example 1 4-hydroxybenzoic acid was acetylated with an excess of acetic anhydride and a catalytic amount of pyridine in refluxing toluene. The crystallized monomer had a melting point of 182–184° C.

Acetylsalicylic acid, tert.-butyl hydroquinone and titanium tetra isopropoxide were provided from Aldrich Co. and used as received.

The tert.-butyl hydroquinone was acetylated with an excess of acetic anhydride and a catalytic amount of pyridine in refluxing toluene.

Methods:

The inherent viscosities were measured with an automated Ubbelohde viscometer thermostated at 20° C.

The DSC measurements were conducted with a Perkin Elmer DSC-7 in aluminum pans under nitrogen at a heating and cooling rate of 20° C./min.

The 100 MHz $^1$H NMR spectra were recorded on a Bruker AC-100 FT NMR spectrometer in 5 mm o.d. sample tubes. CDCl$_3$/TFA (volume ratio 4:1) containing TMS served as solvent.

Rheological Measurements:

In order to evaluate the influence of ASA on the rheological and mechanical properties of the LC copolyesters two kinds of rheological measurements were conducted. First, the shear stress was fixed at 200 Pa and the shear frequency was fixed at 1 Hz whereas the temperature and the composition of the copolyesters were varied. From these series of measurements the storage modulus G', the loss modulus G" and the dynamic viscosity η* were determined. Second, the dynamic viscosities were measured at a fixed temperature with variation of the frequency from $10^{-3}$ to 20 Hz.

The rheological measurements were performed with a Bohlin-Instruments CVO-Rheometer with a parallel plate geometry (25 mm diameter plates). The specimens used for these measurements were melt pressed from 0.7 g samples at a temperature 40° C. above their Tg in a hydrulic press "Schwabenthan Polystat 100". Prior to any frequency sweeps time and strain sweeps were measured to find the regime of linear dependency. The frequency sweeps were conducted isothermally between 170 and 250° C. in steps of 20° C. The frequency was varied from 0.001 to 20 Hz. The isotherms were combined to master curves at a reference temperature of 200° C. by the computer program LS-SHIFT.

All experiments were conducted under nitrogen in order to prevent oxidative degradation of the specimen.

COMPARATIVE EXAMPLE 1

This example illustrates the preparation of a copolyester from poly(ethylene terephthalate) and 4-acetoxybenzoic acid.

A mixture of 7.68 g (0.04 moles) of poly(ethylene terephthalate), 10.40 g (0.06 moles) 4-acetoxybenzoic acid is placed in a 100-ml. flask equipped with a stirrer and an inlet and outlet for nitrogen. The flask is evacuated and purged three times with nitrogen at 110° C. and finally heated in an oil bath to 275° C. during 30 minutes. As the mixture is stirred at 275° C. in an nitrogen atmosphere, acetic acid slowly distils from the flask. After 60 min. most of the acid has evolved and a low melt viscosity polyester is obtained. A vacuum of 0.5 mbar is then applied at 275° C., and stirring is continued for four hours. A white, opaque, fibrous copolyester is obtained. The liquid crystalline copolyester has an inherent viscosity of 0.60, a glass transition temperature of 62° C. and a melting temperature of 212° C. This polymer is known as first presented by Jackson and Kuhfuss, U.S. Pat. No. 3,804,805. As far as polymer blends are concerned, the low glass transition temperature and a crystalline nature of this polymer are not favourable properties.

COMPARATIVE EXAMPLE 2

This example illustrates the preparation of a copolyester from poly(ethylene terephthalate) and 2-acetoxy-6-naphthoic acid.

A mixture of 5.76 g (30 mmoles) of poly(ethylene terephthalate), 10.36 g (45 mmoles) of 2-acetoxy-6-naphthoic acid is placed in a 100-ml. flask equipped with a stirrer and an inlet and outlet for nitrogen. The flask is evacuated and purged three times with nitrogen at 110° C. and finally heated in an oil bath to 275° C. during 30 minutes. As the mixture is stirred at 275° C. in an nitrogen atmosphere, acetic acid slowly distils from the flask. After 60 min. most of the acid has evolved and a low melt viscosity polyester is obtained. A vacuum of 0.5 mbar is then applied at 275° C., and stirring is continued for four hours. A white, opaque, fibrous copolyester has an inherent viscosity of 0.83, a glass transition temperature of 82° C. and a melting temperature of 205° C. As illustrated in the comparative example 1, also in this case, when the 4-acetoxybenzoic acid is replaced totally by 2-acetoxy-6-naphthoic acid the low glass transition temperature and a crystalline nature of this polymer are unfavourable properties regarding polymer blends.

EXAMPLE 1

Polyester-Based Liquid Crystalline Polymers

Polycondensations

A) In Bulk

PET (30 mmol), 4-acetoxybenzoic acid (45 mmol), acetylsalicylic acid (8.3 mmol) and dibutyltin oxide were weighed into a cylindrical glass reactor equipped with a mechanical stirrer, a gas-inlet and gas-outlet tube. The reaction vessel was placed in a metal bath preheated to 140° C. and the temperature was rapidly raised to 280° C. (20 min.). Prior to the heating the air was removed by flushing with nitrogen and the acetic acid evolved in the course of 1 h (at 280° C.) and was also removed with a slow stream of nitrogen. After 1 h, vacuum was applied and the stirring was continued for 4 hours more at 280° C. The cold reaction product was dissolved in a mixture of $CH_2Cl_2$ and trifluoroacetic acid (TFA, volume ratio 4:1), precipitated into methanol and dried at 80° C. in vacuo. This procedure corresponds to experiment No. 2, Table 1. All other experiments of this Table were conducted analogously.

The syntheses listed in Table 3 were performed analogously, but since 70 mmol of 4-acetoxybenzoic acid were reacted with 30 mmol of PET, the feed ratio of ASA was adjusted accordingly.

B) With Addition of Acetic Acid

PET (30 mmol), 4-acetoxybenzoic acid (45 mmol), acetylsalicylic acid (8.3 mmol), acetic acid (35 mmol) and dibutyltinoxide (35 mg) were weighed into a cylindrical glass reactor and reacted as described above. This procedure corresponds to experiment No. 8 in Table 2.

The experiments listed in Table 4 were performed analogously, but since 30 mmol of PET were reacted with 70 mmol of 4-acetoxybenzoic acid the feed ratios of ASA and acetic acid, respectively, were adjusted accordingly. The molar amount of ASA was four-fold.

Acetic acid causes a rapid transesterification and degradation of the PET and acts as a solvent for all degradation products and comonomers, and thus, facilitates the formation of homogeneous copolyesters containing random sequences. The copolycondensations performed with a 30:70 feed ratio of PET and acetylated para-hydroxybenzoic acid yielded materials which were partially insoluble in chloroform/tetrahydrofuran mixtures, even when the molar fraction of ASA reached 25%. With addition of acetic acid all poly-condensations yielded entirely soluble copolyesters.

TABLE 1

Yields and properties of 40:60 copolyesters prepared in bulk

| Sample | Feed of ASA, mol-% | Yield, % | $\eta_{inh}$ a), dl/g | $T_{g1}$ b) ° C. | $T_{g2}$ b) ° C. | $T_m$ b) ° C. | $T_i$ c) ° C. |
|---|---|---|---|---|---|---|---|
| 1 | 0 | 88 | 0.65 | 65 | 169 | 217 (weak) | 385–435 |
| 2 | 5 | 93 | 0.57 | 88 | 175 | 216 (weak) | 350–400 |
| 3 | 10 | 95 | 0.43 | 82 | 179 | 193 (weak) | 330–380 |
| 4 | 15 | 88 | 0.32 | 75 | 170 | — | 335–375 |
| 5 | 20 | 82 | 0.33 | 84 | 173 | — | 280–360 |
| 6 | 25 | 76 | 0.28 | 65 | 180 | — | 320–340 | a) measured at 20° C. with c = 2 g/l in $CH_2Cl_2$/trifluoroacetic acid (volume ratio 4/1)
b) determined by DSC-measurements (heating rate 20° C./min)
c) determined by polarization microscopy (heating rate 10° C./min)

TABLE 2

Yields and properties of 40:60 copolyesters prepared with addition of acetic acid

| Sample | Feed of ASA, mol-% | Yield, % | $\eta_{inh}$ a), dl/g | $T_{g1}$ b) °C. | $T_{g2}$ b) °C. | $T_m$ b) °C. | $T_i$ c) °C. |
|---|---|---|---|---|---|---|---|
| 7 | 0 | 92 | 0.76 | 74 | 183 | 252 (weak) | 400–425 |
| 8 | 5 | 95 | 0.63 | 74 | 179 | 240 (weak) | 360–370 |
| 9 | 10 | 99 | 0.39 | 81 | 179 | 254 (weak) | 335–370 |
| 10 | 15 | 93 | 0.29 | 88 | 159 | — | 330–365 |
| 11 | 20 | 95 | 0.32 | 85 | 160 | — | 290–360 |
| 12 | 25 | 76 | 0.24 | 83 | 148 | — | 260–335 | a) measured at 20° C. with c = 2 g/l in $CH_2Cl_2$/trifluoroacetic acid (volume ratio 4/1)
b) determined by DSC-measurements (heating rate 20° C./min)
c) determined by polarization microscopy (heating rate 10° C./min)

TABLE 3

Yields and properties of 30:70 copolyesters prepared in bulk

| Sample | Feed of ASA, mol-% | Yield, % | $\eta_{inh}$ a), dl/g | $T_{g1}$ b) °C. | $T_{g2}$ b) °C. | $T_m$ b) °C. | $T_i$ c) °C. |
|---|---|---|---|---|---|---|---|
| 13 | 0 | 94 | 0.77 d) | 103 | 157 | 266 (weak) | >450 |
| 14 | 5 | 95 | 0.63 d) | 93 | 160 | 268 (weak) | 410–440 |
| 15 | 10 | 96 | 0.51 d) | 99 | 150 | 257 (weak) | 400–430 |
| 16 | 15 | 91 | 0.54 d) | 92 | — | — | 400–425 |
| 17 | 20 | 92 | 0.53 d) | 88 | — | — | 380–400 |
| 18 | 25 | 94 | 0.44 d) | 87 | — | — | 330–360 | a) measured at 20° C. with c = 2 g/l in $CH_2Cl_2$/trifluoroacetic acid (volume ratio 4/1)
b) determined by DSC-measurements (heating rate 20° C./min)
c) determined by polarization microscopy (heating rate 10° C./min)
d) only partially soluble

TABLE 4

Yields and properties of 30:70 copolyesters prepared with addition of acetic acid

| Sample | Feed of ASA, mol-% | Yield, % | $\eta_{inh}$ a), dl/g | $T_{g1}$ b) °C. | $T_{g2}$ b) °C. | $T_m$ b) °C. | $T_i$ c) °C. |
|---|---|---|---|---|---|---|---|
| 19 | 0 | 95 | 0.5 | 101 | 156 (weak) | 261 | >450 |
| 20 | 5 | 94 | 0.58 | 100 | 157 (weak) | 268 (weak) | 415–440 |
| 21 | 10 | 92 | 0.43 | 94 | — | — | 395–410 |
| 22 | 15 | 85 | 0.3 | 104 | — | — | 370–385 |
| 23 | 20 | 85 | 0.23 | 109 | — | — | 340–355 |
| 24 | 25 | 79 | 0.21 | 95 | — | — | 320–340 | a) measured at 20° C. with c = 2 g/l in $CH_2Cl_2$/trifluoroacetic acid (volume ratio 4/1)
b) determined by DSC-measurements (heating rate 20° C./min)
c) determined by polarization microscopy (heating rate 10° C./min)

Figure 2:
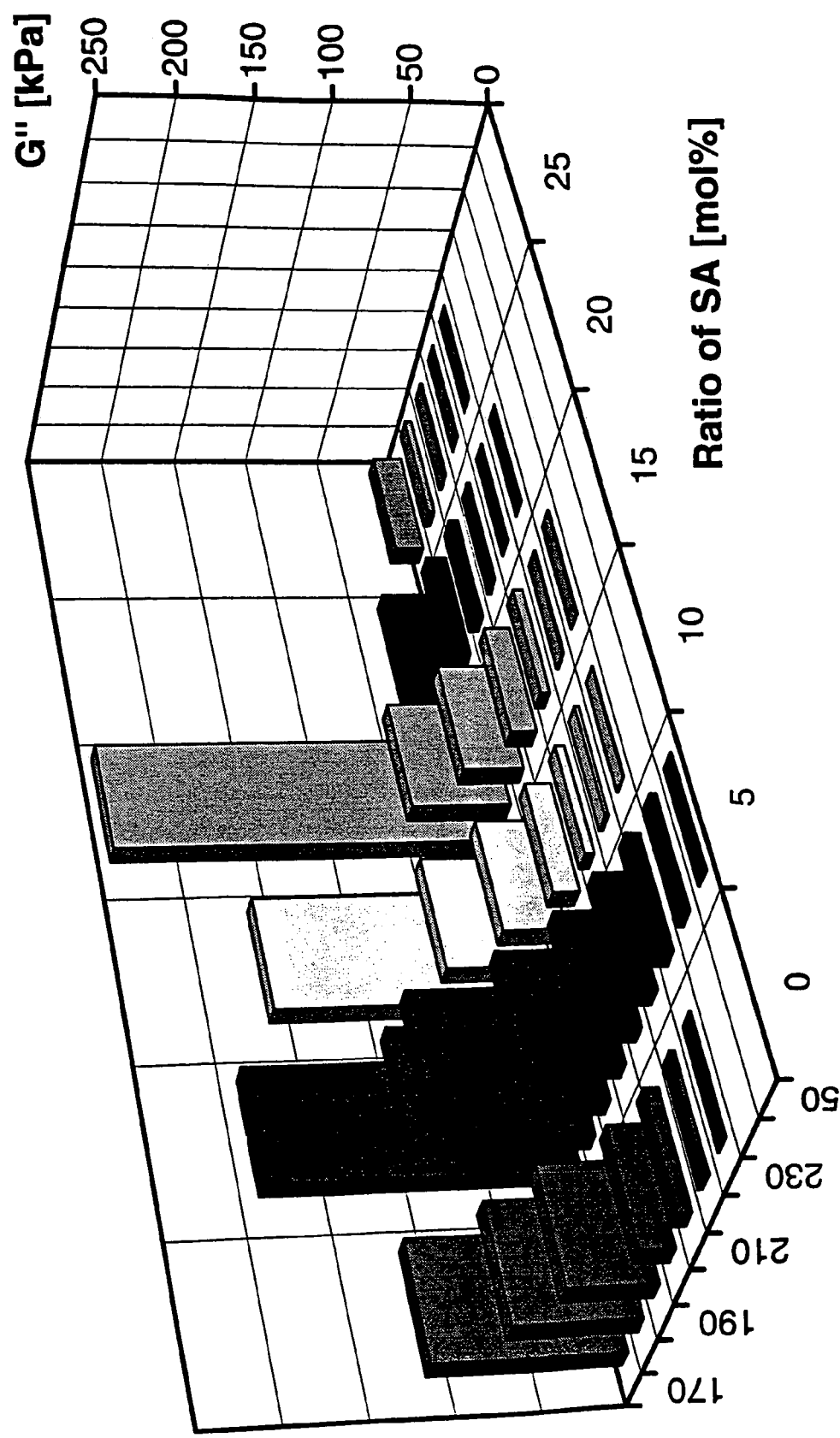
FIG. 2 shows the loss modulus G" of a 40:60 copolyester (Table 1) measured with variation of temperature.
Figure 3:
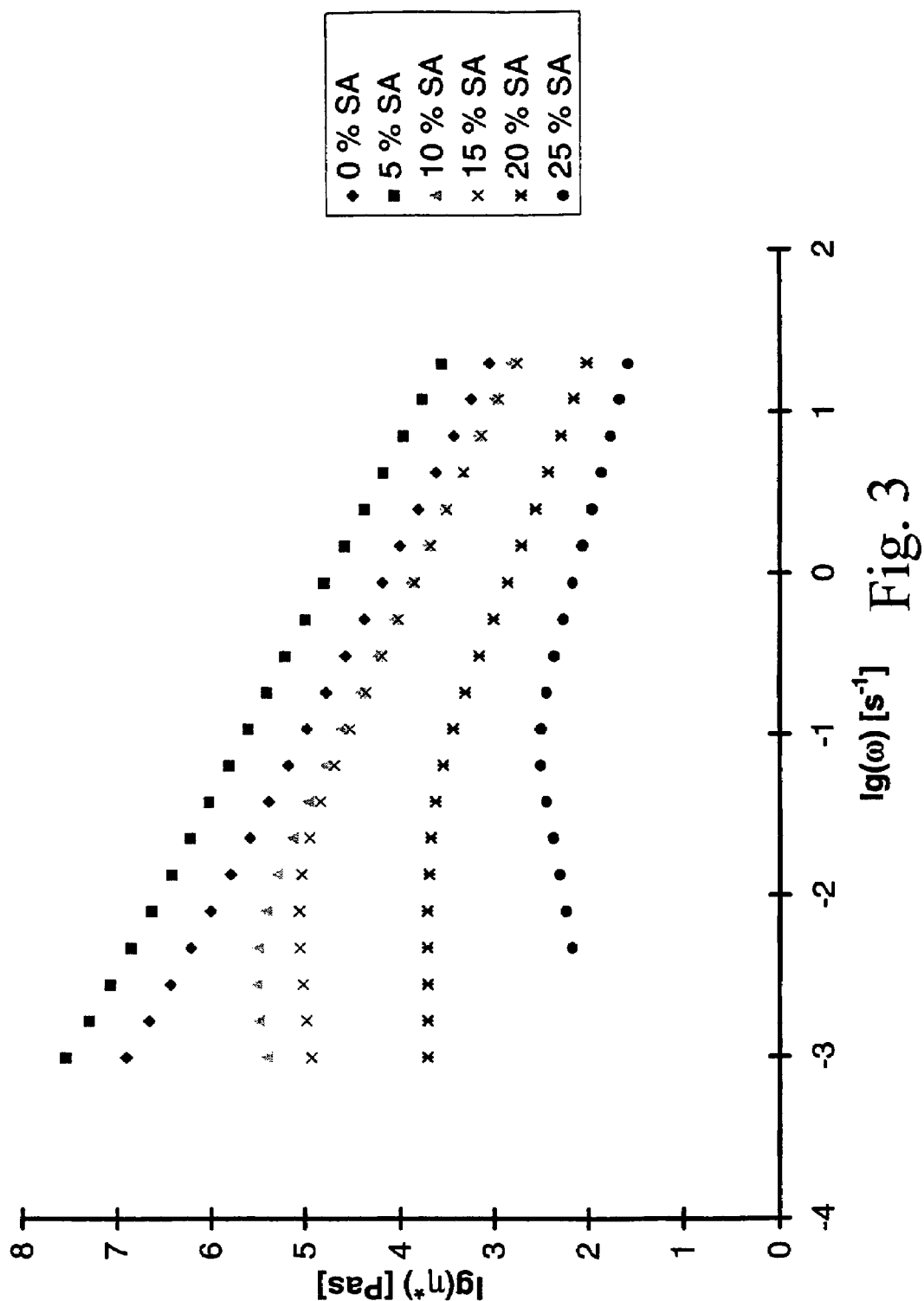
FIG. 3 shows the frequency dependence of the dynamic viscosity of the 40:60 copolyesters (Table 1) measured at 200° C.

For the first series of copolyesters (Table 1) the following trends were observed. All melt-strength indicators of the samples (G', G" and $\eta^*$) show a continuous exponential downward trend with increasing temperature. No phase transition is detectable in agreement with the DSC measurements. The storage modulus, G', exhibits a maximum at 5 mol % ASA at most temperatures (FIGS. 1 to 3) The dynamic viscosities, $\eta^*$, displayed exactly the same trend. The maximum value of $\eta^*$ reached 230 kPas with 5 mol % of ASA at 170° C. and the sample containing 15 mol % of ASA showed the absolute maximum of the loss modulus, G", but at higher temperatures the highest values of G" were observed for the 5 mol % sample. Therefore, it can be said that also G" follows the general trend indicated by G' and $\eta^*$. This trend is remarkable and informative, because the solution viscosities decrease steadily with higher molar fractions of ASA, and thus, the maxima of G', G" and $\eta^*$ cannot be explained by a particularly high molecular weight. This result suggests that the incorporated ASA forms indeed hair-pin conformation favoring entanglements. The competition between decreasing molecular weight and increasing concentration of hair-pin conformation results in a maximum of the melt strength at 5 mol % of ASA.

EXAMPLE 2

Polymers were synthesized by polycondensation and transesterification in bulk at temperatures up to 280° C. using titanium tetraisopropoxide as catalyst. N-(4-carboxyphenyl) trimellitimide, acetylated tert.-butylhydroquinone, acetyl salicylic acid (ASA) were used as monomers and commercial PET served as reaction partner for two series of experiments. Tert.-butylhydroquinone was selected as comonomer, because it favours the formation of non-crystalline copoly(ester imide)s, having high glass-transition temperatures (Tg's) and a broad temperature range of the nematic phase. Phenyl-hydroquinone imparts the same properties, but it is more expensive, whereas methyl and chlorohydroquinone favour the formation of crystallizable blocks.

A first series of copoly(ester imide)s was prepared just by copolycondensation of N-(4-carboxyphenyl) trimellitimide, acetylated tert.-butylhydroquinone and ASA with variation of the molar fraction of ASA. The results are listed in Table 5.

An increasing molar fraction of ASA resulted in lower yields and lower viscosity values. The lower yields are not a consequence of lower conversions, because ASA is reactive enough at 280° C., and even a partial distillation from the reaction mixture would not effect the balance of the functional groups. Obviously, the formation of supermacrocycles is responsible for the lower molecular weights, which entail fractionation upon precipitation into methanol.

A second series of copoly(ester imide)s was prepared by transesterification of PET with N-(4-carboxyphenyl) trimellitimide, acetylated tert.-butylhydroquinone and ASA. Again the molar feed of ASA was varied over a broad range. The results summarized in Table 6. In this series the influence of the ASA on the Tg is less pronounced than in the first series above, because the basic value, (i.e. the Tg of the ASA-free copoly(ester imide) No. 32) is much lower than that of the homo poly(ester mide) free from PET (No. 25, Table 5).

In order to elucidate the influence of the molecular weight on the properties of these copoly(ester imide)s more precisely, a third series of copoly(ester imide)s was prepared. The composition was fixed at 10 mol % salicylic acid units. The first two members of this series were obtained by multiple repetition of the polycondensation/transesterifications. The copoly(ester imide)s Nos. 41–43 (Table 7) were prepared with addition of benzoic acid as chain terminator.

Polycondensations

N-(4-carboxyphenyl)-trimellitimide (20 mmol), bisacetyl tert.-butylhydroquinone (20 mmol) and acetylsalicylic acid (10 mmol) were weighed into a cylindrical glass reactor equipped with stirrer, gas-inlet and gas-outlet tubes. This reaction vessel was placed into an oil bath preheated to 130° C. The temperature was then rapidly raised to 280° C. and maintained there for 4 hours. The evolved acetic acid was removed with a slow stream of nitrogen. Finally, vacuum was applied for 0.5 hours. After cooling the copolyester was dissolved in a 4:1 (by volume) mixture of $CH_2Cl_2$ and trifluoroacetic acid and precipitated into cold methanol. The precipitated copolyester was isolated by filtration and dried at 80° C. in vacuo.

All other polycondensations listed in Table 5 were conducted analogously.

Transesterifications

PET (50 mmol), N-(4-carboxyphenyl) trimellitimide (10 mmol) acetylated tert.-butylhydroquinone (20 mmol), acetylsalicylic acid (10 mmol and one drop of Ti(OiPr) were weighed into a cylindrical glass reactor and polycondensed as described above (a homogeneous melt was observed after 30 min. at 280° C.).

TABLE 5

Polycondensations of N-(4-carboxyphenyl/trimellitimide) (A), acetylated tert.-butylhydroquinone (B) and ASA (C) in bulk at 280° C.

| Sample | Molar feed ratio A:B:C | Yield, % | $\eta_{inh}^{a)}$, dl/g | $T_g^{b)}$ ° C. | $T_i^{c)}$ ° C. |
|---|---|---|---|---|---|
| 25 | 2:2:1 | 88 | 0.4 | 183 | >450 |
| 26 | 2:2:2 | 79 | 0.28 | 182 | >450 |
| 27 | 2:2:3 | 83 | 0.26 | 179 | 310–325 |
| 28 | 2:2:4 | 80 | 0.22 | 172 | 275–285 |
| 29 | 2:2:5 | 76 | 0.2 | 169 | 270–280 |
| 30 | 2:2:6 | 74 | 0.11 | 175 | 250–260 |

$^{a)}$measured at 20° C. with c = 2 g/l in $CH_2Cl_2$/trifluoroacetic acid (volume ratio 4/1)
$^{b)}$determined by DSC-measurements (heating rate 20° C./min)
$^{c)}$determined by polarization microscopy (heating rate 10° C./min)

TABLE 6

Transesterifications of PET (A), N-(4-carboxyphenyl/trimellitimide) (A), acetylated tert.-butylhydroquinone (C) and ASA (D) in bulk at 260–280° C.

| Polym. No. | Molar feed ratio A:B:C:D | Salicylic acid | Yield, % | $\eta_{inh}$ a), dl/g | $T_g$ b) ° C. | $T_i$ c) ° C. |
|---|---|---|---|---|---|---|
| 31 | 5:2:2:0 | 0 | 96 | 0.41 | 127 | 275–285 |
| 32 | 5:2:2:0.5 | 5.3 | 98 | 0.59 | 124 | 260–280 |
| 33 | 5:2:2:1 | 10 | 91 | 0.67 | 121 | 270–280 |
| 34 | 5:2:2:2 | 18.2 | 90 | 0.45 | 112 | 200–210 |
| 35 | 5:2:2:3 | 25 | 85 | 0.34 | 117 | 175–195 |
| 36 | 5:2:2:4 | 30.8 | 84 | 0.24 | 113 | 160–170 |
| 37 | 5:2:2:5 | 35.7 | 86 | 0.21 | 112 | 150–160 |
| 38 | 5:2:2:6 | 40 | 85 | 0.18 | 108 | <150 | a) measured at 20° C. with c = 2 g/l in $CH_2Cl_2$/trifluoroacetic acid (volume ratio 4/1)
b) determined by DSC-measurements (heating rate 20° C./min)
c) determined by polarization microscopy (heating rate 10° C./min)

TABLE 7

Transesterifications of PET (A), N-(4-carboxyphenyl/trimellitimide) (A), acetylated tert.-butylhydroquinone (C) and ASA (D) in bulk at 260–280° C.

| Sample | Molar feed ratio A:B:C:D | Yield, % | $\eta_{inh}^{a)}$, dl/g | $T_g^{b)}$ ° C. | $T_i^{c)}$ ° C. |
|---|---|---|---|---|---|
| 39 | 5:2:2:1 | 91 | 0.65 | 128 | 270–285 |
| 40 | 5:2:2:1 | 90 | 0.54 | 125 | 275–290 |
| 41 | 5:2:2:1 | 98 | 0.46 | 118 | 270–290 |
| 42 | 5:2:2:1 | 92 | 0.37 | 112 | 265–275 |
| 43 | 5:2:2:1 | 82 | 0.19 | 102 | 240–260 |

$^{a)}$measured at 20° C. with c = 2 g/l in $CH_2Cl_2$/trifluoroacetic acid (volume ratio 4/1)
$^{b)}$determined by DSC-measurements (heating rate 20° C./min)
$^{c)}$determined by polarization microscopy (heating rate 10° C./min)

As evidence by the above results, incorporation of acetyl salicylic acid into two series of copoly (ester-imide)s proved to be feasible while simultaneously maintaining the liquid-crystalline phase. However, high molecular weights were somewhat difficult to obtain. The incorporation of salicylic acid into the polyester chain had an influence on most properties, such as the glass-transition temperature, the isotropization temperature, the elastic modulus or the stress at breack. The influence of the salicylic acid moieties on the properties of the melts was found to be very complex. All observed effects may be explained by the existence on entanglements in the nematic phase. The incorporation of salicylic acid is an interesting approach to modify the melt strength of LC-polyesters.

EXAMPLE 3

Polycondensation of HNA and HBA (3:7) with Addition of 10 mol % ASA 6.91 g (30 mmol) 6-acetoxy-2-naphthoic acid, 12.61 g (70 mmol) 4-acetoxybenzoic acid, 2.00 g (11.1 mmol) acetylsalicylic acid and 30 mg magnesium oxide were weighed into a cylindrical glass reactor, which was treated with dimethyl dichlorosilane and washed with dry ether before use. The reactor was equipped with a mechanical stirrer and gas inlet and outlet tubes. The reaction mixture was placed into a metal bath preheated to 120° C. The flask was evacuated and purged with nitrogen four times to remove all air. The temperature was then quickly raised to 240° C. After 20 minutes the mixture was a homogeneous melt and within 2 hours the temperature was raised to 340° C. in a stepwise manner. The evolved acetic acid was removed with a slow stream of nitrogen. Finally, vacuum was applied for 0.5 hours while stirring was continued.

Yield: 13.1 g (88%)
$T_g$=98° C.
$T_{m1}$=266° C.
$T_{m2}$=343° C. (all from DSC measurements)

TABLE 8

Yields and properties of 30:70 copolyesters of HNA and HBA

| Sample | Feed of ASA, mol-% | Yield, % | $\eta_{inh}$ a), dl/g | $T_g$ b) ° C. | $T_{m1}$ b) ° C. | $T_{m2}$ b) ° C. | $T_i$ c) ° C. |
|---|---|---|---|---|---|---|---|
| Vectra A900 | | | d) | 102 | 285 | 343 | >500 |
| 44 | 0 | 96 | d) | 98 | 268 | 339 | >500 |
| 45 | 5 | 94 | d) | | | | >500 |
| 46 | 10 | 88 | d) | 98 | 266 | 343 | >500 |
| 47 | 20 | 78 | d) | 100 | 251 | 341 | >500 |

TABLE 8-continued

Yields and properties of 30:70 copolyesters of HNA and HBA

| Sample | Feed of ASA, mol-% | Yield, % | $\eta_{inh}$ a), dl/g | $T_g$ b) °C. | $T_{m1}$ b) °C. | $T_{m2}$ b) °C. | $T_i$ c) °C. |
|---|---|---|---|---|---|---|---|
| 48 | 30 | 70 | d) | 98 | 238/256 | 344 | 400–440 | a) measured at 20° C. with c = 2 g/l in CH$_2$Cl$_2$/trifluoroacetic acid (volume ratio 4/1)
b) determined by DSC-measurements (heating rate 20° C./min)
c) determined by polarization microscopy (heating rate 10° C./min)
d) not soluble in CH$_2$Cl$_2$/trifluoroacetic acid -mixtures or in pure trifluoroacetic acid As will appear from the above results, at moderate addition rates (up to 20% of feed) ASA lowered the melting point of the LC polymer by some 20 to 35° C. Nevertheless, the polymer still retained its liquid crystalline properties at temperatures up to 500° C. Thus, an addition of ASA to a conventional LC polymer of the Vectra-type makes it possible to process the polymer at lower temperatures while simultaneously broadening the actual temperature range in which the polymer exhibits LC properties. As a further advantageous feature it should be pointed out that, based on the above results, the addition of ASA does not essentially lower the glass transition point of the polymer.

EXAMPLE 4

1683 g PET (70 mol %), 584 g N-(4'-carboxyphenyl) trimellitimide (15 mol %) and 458 g 2,7-diacetoxynaphthalene (15 mol %) were added to a 5 liter thermostated steel reactor equipped with a stirrer and inlet and outlet for nitrogen and application of vacuum. The reaction mixture was preheated to 55° C., evacuated and purged with nitrogen 4 times to remove all air. The temperature was then raised to 270° C. in 1 h and kept there for 2 h to remove the acetic acid with a slow stream of nitrogen after which the temperature was raised rapidly to 280° C. and kept there for 1 h to remove more of the acetic acid. When no more acetic acid was removed 10 mbar vacuum was applied and the mixing continued until the torque of the stirrer reached 400 Nm (5 h) and the polymerization was considered finished. Then the molten LCP was pushed out of the reactor with an overpressure of nitrogen and was pelletized under water. The amount of LCP obtained was 2.3 kg which corresponds to a 85% yield.

For performance evaluation injection moulded test bars and extruded cast films (200 μm) were made at the melt temperature 210° C. When extruding films, melt temperatures as low as 150° C. could be used and surprisingly the films were transparent. When extending the molten film by hand it appeared to be elastic in both machine direction and transverse direction. Transparent LCP-films with elastic properties at 150° C. have never been reported before. This property combination makes it possible to make for instance transparent single or multilayer bottles with the stretch blow moulding technique and the LVP-layer provides a gas barrier sufficient for beer bottles.

| Properties: | $\eta_{inh}$ = | 0.24 dl/g |
|---|---|---|
| | $T_g$ (amorphous) = | 105° C. |
| | Charpy Impact (ISO 179) | |
| | Unnotched = | 3.3 kJ/m$^2$ |
| | Notched = | 0.7 kJ/m$^2$ |
| | Tensile modulus (ISO 527) = | 2.8 GPa |
| | Tensile strength (ISO 527) = | 17.9. MPa |
| | Tensile elongation (ISO 527) = | 0.7% |
| | Flexural modulus (ISO 178) = | 2.4 GPa |
| | Flexural strength (ISO 178) = | 33.8. MPa |
| | Oxygen transmission rate <5 cm$^3$ * μm/(m$^2$ * d * bar) (23° C., 50% RH) | |

The terms and expressions which have been employed are used as terms of description and not of limitation, and there is no intention in the use of such terms and expressions of excluding any equivalents of the features shown and described or portions thereof, it being recognized that various modifications are possible within the scope of the invention

The invention claimed is:

1. A thermotropic main-chain liquid crystalline homo- or copolymer forming a liquid crystalline phase, having therein an aromatic monomer with at least one functional group in ortho-position, said polymer is produced by the transesterification of a polyester selected from the group consisting of poly(ethylene terephthalate), poly(butylene terephthalate), poly(ethylene naphthalate), poly(butylene naphthalate), poly(trimethylene terephthalate), poly(trimethylene naphthalate), poly(cyclohexane dimethanolterephthalate) and/or poly(cyclohexane dimethanolnaphthalate) and having entanglements, increased melt strength and isotropic and anisotropic properties, said aromatic monomer being selected from the group consisting of at least one of acetylsalicylic acid, diacetylated catechol, or a derivative thereof.

2. The polymer of claim 1, wherein the aromatic monomer comprises a naphthalene or biphenyl structure.

3. The polymer of claim 1, wherein the amount of the ortho-substituted monomer is 0.1 to 30 mol % of the polymer.

4. The polymer of claim 1, further comprising at least one of 4-acetoxybenzoic acid, 2-acetoxy-6-naphthoic acid, N-(4'-carboxyphenyl)-trimellitic acid imide, terephthalic acid, hydroquinone and/or substituted hydroquinone, biphenyldiol, paraminophenol and/or various dihydroxy naphtalenes.

5. The polymer of claim 4, wherein the substituted hydroquinone is selected from the group consisting of methylhydroquinone, tert.-butylhydroquinone and/or phenylhydroquinone.

6. The polymer of claim 1, wherein the polymer is amorphous.

7. The polymer of claim 1, wherein the polymer is processible by extrusion.

8. The polymer of claim 1, wherein a carboxylic acid is present during a polycondensation.

9. The polymer of claim 1, containing mesophases and wherein each of the mesophases is of a size less than the a wavelength of visible light.

10. A thermoplastic polymer blend comprising an LCP according to claim 1, and wherein the LCP is compatible with other thermoplastic blending components of the blend.

11. The thermoplastic polymer blend of claim 10, wherein the LCP and the other thermoplastic blending components have been compatibilized.

12. The thermoplastic polymer blend according to claim 11, wherein the compatibilizer is a thermoplastic polymer containing functional groups and/or block segments.

13. A processed thermoplastic product, comprising the LCP of claim 1 and/or a polymer blend comprising the LCP of claim 1.

14. The thermoplastic product of claim 13, wherein said product has been processed by at least one of blown-film extrusion, cast-film extrusion, sheet extrusion, pipe extrusion, cable extrusion, extrusion coating, extrusion blow-moulding, injection blow-moulding, injection moulding, all in single-layer or multi-layer constructions.

15. The thermoplastic product of claim 13, comprising an extruded transparent film.

16. The thermoplastic product of claim 13, comprising an extruded transparent LCP-film exhibiting elastic properties at <200° C.

17. A method of increasing the melt-processibility of a polyester-based liquid crystalline polymer comprising: incorporating into the polymer an aromatic monomer [polymer] having at least one functional group in ortho-position in an amount of 0.1 to 30 mol-%, wherein said polymer is produced by the transesterification of a polyester selected from the group consisting of poly(ethylene terephthalate), poly(butylene terephthalate), poly(ethylene naphthalate), poly(butylene naphthalate), poly(trimethylene terephthalate), poly(trimethylene naphthalate), poly(cyclohexane dimethanolterephthalate) and/or poly(cyclohexane dimethanolnaphthalate).

18. The method of claim 17, wherein the least one functional group in ortho-position is a hydroxyl and/or a carboxylic group or a derivative thereof.

19. The method according to claim 18, wherein the aromatic monomer has the general formula $$\text{o-}X^1\text{—Ar—}X^2 \qquad \text{(IV)}$$

wherein

Ar is an aromatic ring structure and $X^1$ and $X^2$ represent independently functional groups capable of reacting with hydroxy, carboxy or amino groups to form ester, amide, imide, ether or carbonate bonds.

20. The method of claim 18, wherein the aromatic monomer is acetylsalicylic acid or diacetylated catechol or a derivative thereof.

* * * * *